March 7, 1967
S. PASHAIAN ETAL
3,307,704
FILTER APPARATUS
Filed May 1, 1964
2 Sheets-Sheet 1
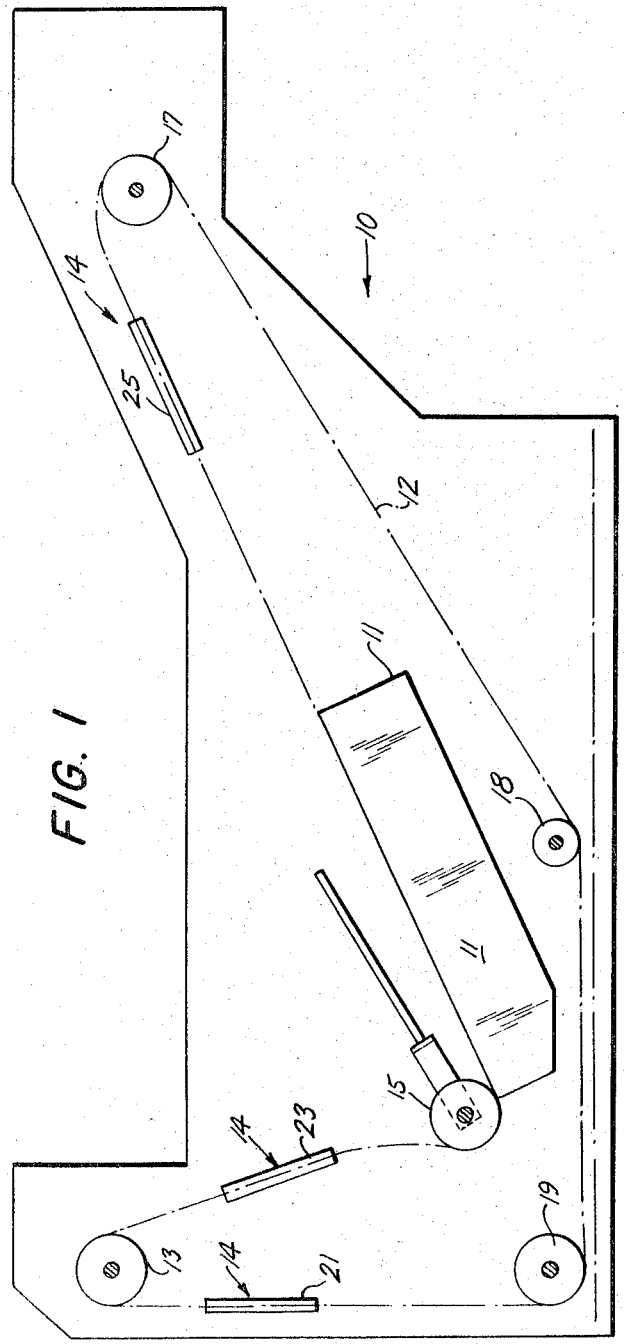
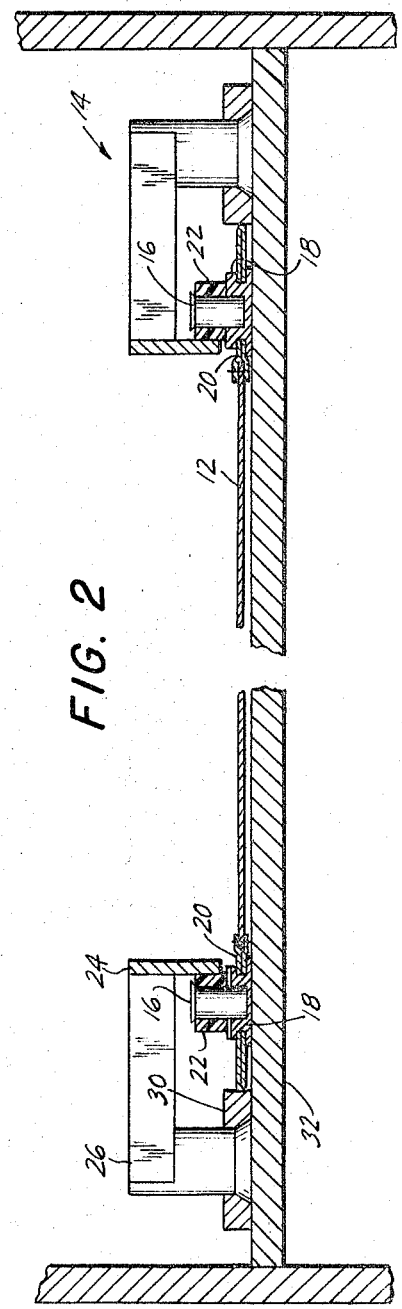
INVENTORS
SARK PASHAIAN
JAMES MORRISON STEWART
BY
*Curtis, Morris & Safford*
ATTORNEYS

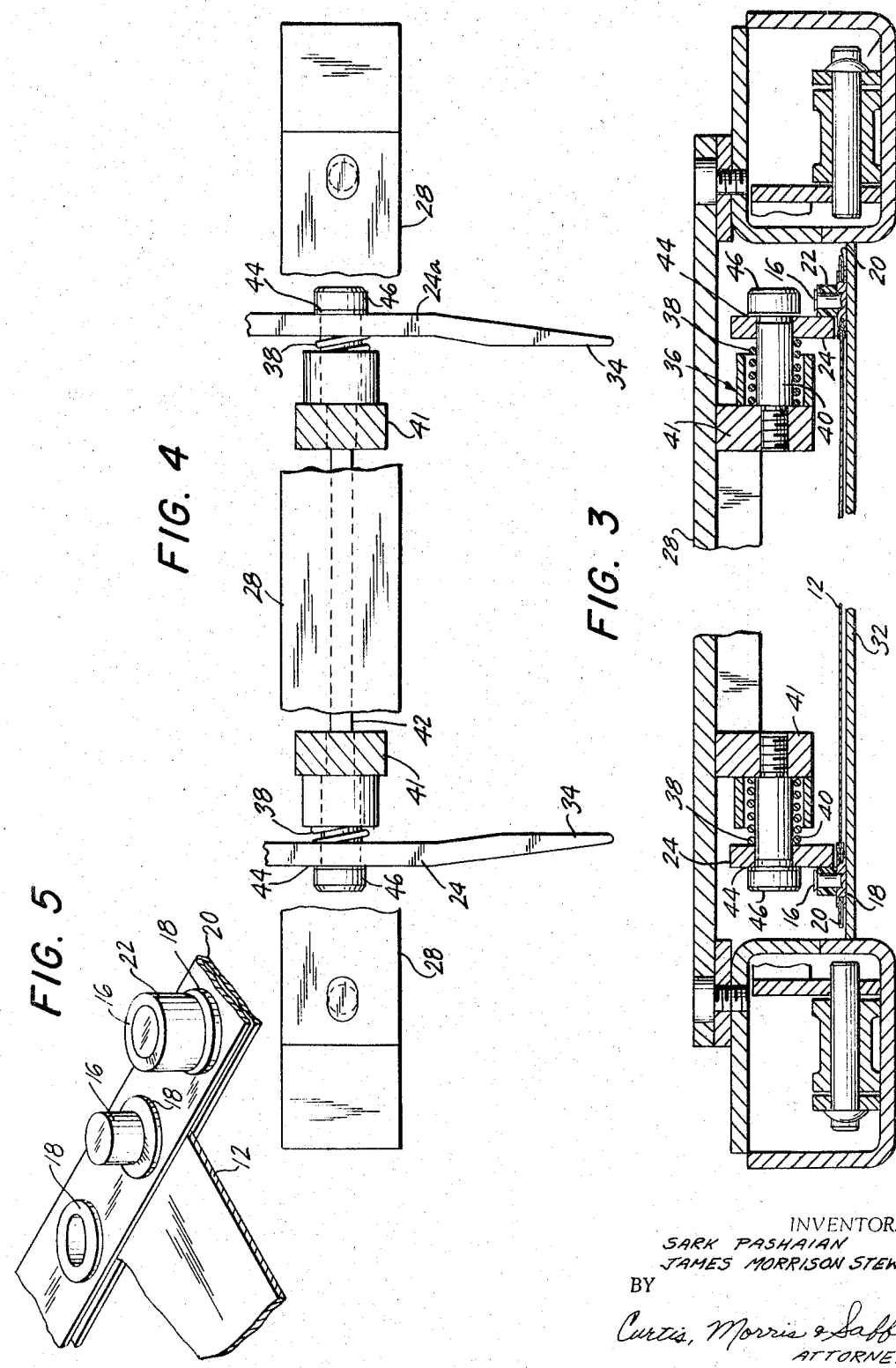

United States Patent Office 3,307,704
Patented Mar. 7, 1967

3,307,704
FILTER APPARATUS
Sark Pashaian, Monroe, and James M. Stewart, Dearborn, Mich., assignors to Ajem Laboratories, Inc., Livonia, Mich.
Filed May 1, 1964, Ser. No. 364,201
1 Claim. (Cl. 210—400)

This invention relates to apparatus useful in maintaining continuous belts and the like on a predetermined path. More particularly this invention relates to means for maintaining a continuous filter sheet on a predetermined path while avoiding the formation of wrinkles on the sheet.

It has long been a problem in the art to maintain sheets, e.g., the support belts on which filter sheets are sometimes carried along a desired path. Even when alignment of the sheet seems very nearly perfect, the media tends to be displaced sidewards as it moves over the various drums or pulleys associated with filter equipment. Even where lateral guidebars are utilized, the media tends to be displaced sidewards and wrinkle or rub against the guidebars with resultant damage to the filter sheet. These problems often make impractical the use of inexpensive filter media which are more vulnerable to abrasion. Even the more expensive filter media often become damaged. Such damaged media may split or rise up and allow dirty fluid to pass through into the chambers for clean filtrate.

Clearly, maintenance costs are increased and efficiency of operation is decreased until these problems can be economically solved. These problems are not limited to filters and the "tracking" of filter sheets, but extend generally throughout the mechanical arts wherever equipment utilizes a belt of material which is passed around pulleys or drums.

Therefore, it is an object of the present invention to provide apparatus useful in maintaining belts, etc., on a predetermined path. It is another object of the invention to provide convenient means for controlling lateral shifting or creep or filter strips. It is another object of the invention to provide aligning means for filter strips to reduce wear and abrasion of the strip and reduce maintenance time required for servicing and repair. It is still another object of the invention to provide inexpensive sheets adapted for such economic and convenient alignment.

In applicant's invention a filter sheet or other continuous belt is provided with an edge-reinforcement. Conveniently this is a U-shaped band attached, as by sewing, to enclose the lateral edge of the continuous belt. This edge band can be of canvas, plastic sheeting or other such material. The band has two principal functions:

(1) To provide wear-resistant edge for the continuous belt.

(2) To provide a base into which guide means may be anchored.

As will be seen below, one especially convenient guide means is a grommet pin inserted into a grommet set in the edge band. However, other projecting guides can also be utilized in the present invention.

In usual practice, projecting guides are spaced along both lateral edges of the belt and are engaged by guide rails on the respective sides of the belt, causing the belt to be held in strict alignment. On most equipment, it is sufficient to have these guide rails placed in a few positions along the belt where it has the greatest tendency to lateral shifting; it is not usually necessary for them to line the entire route of the belt.

The guide rails may be curved or straight and are preferably tapered inward at the ends nearest to the projecting guide members to aid the engagement of guide rail with guide members.

In this application and accompanying drawings, we have shown and described a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art may more fully understand the invention and the principles thereof and will be enabled to modify it and embody it in a variety of forms, each as may be best suited to the condition of a particular case.

In the drawings:

FIGURE 1 is a schematic elevation of a typical filter apparatus showing the placement of the filter guiding equipment.

FIGURE 2 is a cross-section of a filter belt showing one embodiment of the guiding equipment of the instant invention and its relationship to the filter sheet.

FIGURE 3 is a cross-sectional view with the center portion broken away, of an embodiment of the invention showing spring-pressed stationary guides.

FIGURE 4 is a partial plan view of the equipment shown in FIGURE 3.

FIGURE 5 shows more detail respecting the grommet attached to the filter sheet.

FIGURE 1 shows a filter apparatus 10.

A belt, e.g., a filter strip 12, is continuously passed over a suction box 11, around rolls 13, 15, 17, 18 and 19. At three points on the apparatus guide assemblies 21, 23 and 25, respectively, are placed to assure control over the lateral movement of the filter sheet.

Referring to FIGURE 1, it is seen that in the use of the equipment described herein, it is not necessary to guide the filter sheet 12 continually, but occasional placement of guide assemblies 14 usually suffices to provide proper control of the filter sheet. We have found it advantageous to locate the guide assemblies between the various rolls rather than adjacent the rolls or adjacent the filter box. This is because such placement largely avoids the resistance to lateral movement caused by the friction of filter sheet against the rolls or filter surface.

Referring to FIGURE 2, a grommet pin 16 is mounted in a grommet 18 which, in turn, is set in edge band 20. Edge band 20 comprises a U-shaped strip, e.g., of canvas, reinforcing each lateral edge of filter sheet 12. FIGURE 5 shows more detail of this construction. A roller 22 is mounted on grommet pin 16 to provide a rolling surface for contact with stationary guides 24. Such stationary guide rails 24 are attached to stationary guide support members 26. Around the base of stationary guide 24 is an edge guide 30. Supporting the filter sheet is filter frame 32 to which stationary guide support member 26 is attached.

Grommet 18 is of sufficient width to provide a firm base for grommet pin 16. Thus grommet 18 extends far enough toward the edge of edge band 20 so that horizontal stress applied to pins 16 by stationary guide 24 cannot cause the pin to tilt to its side.

When a plurality of the grommet pin assemblies are spaced along a filter sheet, the sheet is prevented from creeping laterally because the restrain exerted by guide rail 24, which extends along both sides of the filter zone, controls lateral movement of the filter sheet.

Referring to FIGURE 4, another embodiment of the invention is shown employing a different kind of support for the stationary guide rail 24a. However, the guide rails 24a are essentially the same as those employed in the apparatus shown in FIGURES 1 and 2. Guide rails 24a are angled inward at the ends 34 where they are first contacted by the grommet pin rollers 22 as the filter sheet is moved along its proper path. These angled ends provide means for gradually urging the filter sheet into the desired position when it approaches the guide assembly with somewhat of a lateral displacement. Moreover, angled ends 34 ease the feeding of filter sheet 12 through the apparatus on start-up.

Referring to FIGURES 3 and 4, it is seen that, instead of utilizing a rigid support for guide rail 24, a spring-mounting 36 is utilized here. This spring-mounting is attached to stationary guide support plate 28 and comprises a spring 38 carried on a stud 40 secured in a block 41 welded on the under side of plate 28. The guide rail bears against roller 22 on grommet pin 16, as best shown on FIGURE 3, and a reinforcing bar 42 extends between the blocks 41. Head 46 on stud 40 serves to limit outward movement of rail 24, but normally has clearance at 44 so that spring 38 exerts pressure through rail 24 on the roller 22 and pin 16 to stretch belt 12 laterally.

Spring 38 provides yieldable stress between the grommet pin 16 and stationary guide rail 24 and thus reduces the probability of any binding or serious scraping action between rail 24 and grommet pin 16. Frame plate 28 extends across the width of the filter apparatus supporting the spring-mounting at either end.

We claim:

Filter apparatus comprising:
a frame;
a continuous filter sheet having a reinforcing edge band on each lateral edge, grommets set at spaced points along each said edge band, grommet pins mounted in said grommets and projecting from said edge bands, and rollers mounted on said grommet pins;
means for passing said sheet along a predetermined path;
and a guide assembly for said filter sheet having studs set at spaced points along said predetermined path on said frame adjacent opposite edges of said filter sheet and disposed transverse to the movement of said filter sheet, guide rails movable along said studs to engage said rollers, the terminal portions of said guide rails slanted inwardly toward the center of said filter sheet forming means to intercept said guide rollers and drive them outwardly to said predetermined path, and coil springs around said studs urging said guide rails outward, whereby said rollers, grommet pins and lateral edges of said filter sheet are urged outward to said predetermined path.

References Cited by the Examiner

UNITED STATES PATENTS

| | | | |
|---|---|---|---|
| 2,619,232 | 11/1952 | Parsons et al. | 210—400 X |
| 3,077,990 | 2/1963 | Peterson | 210—401 |
| 3,197,030 | 7/1965 | Black | 210—400 |
| 3,225,928 | 12/1965 | Black | 210—160 X |

REUBEN FRIEDMAN, *Primary Examiner.*

SAMIH N. ZAHARNA, *Examiner.*